US011989509B2

(12) United States Patent
Rakshit et al.

(10) Patent No.: US 11,989,509 B2
(45) Date of Patent: May 21, 2024

(54) GENERATIVE ADVERSARIAL NETWORK IMPLEMENTED DIGITAL SCRIPT MODIFICATION

(71) Applicant: INTERNATIONAL BUSINESS MACHINES CORPORATION, Armonk, NY (US)

(72) Inventors: Sarbajit K. Rakshit, Kolkata (IN); Sathya Santhar, Chennai (IN); Samuel Mathew Jawaharlal, Chennai (IN); Sridevi Kannan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 17/446,858

(22) Filed: Sep. 3, 2021

(65) Prior Publication Data
US 2023/0071456 A1  Mar. 9, 2023

(51) Int. Cl.
G06V 20/40 (2022.01)
G06F 3/01 (2006.01)
G06F 3/04842 (2022.01)
G06F 40/166 (2020.01)
(Continued)

(52) U.S. Cl.
CPC ............ *G06F 40/205* (2020.01); *G06F 3/011* (2013.01); *G06F 3/04842* (2013.01); *G06F 40/166* (2020.01); *G06T 3/40* (2013.01); *G06T 11/60* (2013.01); *G06V 20/40* (2022.01); *G06T 2200/24* (2013.01); *G06V 20/46* (2022.01)

(58) Field of Classification Search
CPC ................................. G06V 20/46; G10L 15/18
See application file for complete search history.

(56) References Cited

U.S. PATENT DOCUMENTS 9,568,993 B2 * 2/2017 Bokor ..................... G06F 3/011
9,858,264 B2 * 1/2018 Dutta .................... G06F 40/131
(Continued)

FOREIGN PATENT DOCUMENTS

WO   WO-2021258920 A1 * 12/2021 ......... G06K 9/00268

OTHER PUBLICATIONS

Li, et al. "StoryGAN: A Sequential Conditional GAN for Story Visualization," CVPR 2019. (Year: 2019).*
(Continued)

*Primary Examiner* — Feng-Tzer Tzeng
(74) *Attorney, Agent, or Firm* — Schmeiser, Olsen & Watts, LLP; Edwards Wixted

(57) ABSTRACT

A system, method, and computer program product for implementing digital script modification is provided. The method includes generating image sequences associated with textual content of a digital story. Multiple contextual dimensions are identified within the textual content and a group of dimensions are selected. The image sequences in combination with the group of dimensions are expanding or contracted and image sequences are altered based on detected interactions with the group of dimensions. Dimensions are extracted from the group of dimensions during presentation of the digital story and a scriptwriter is enabled to modify the dimensions. The image sequences are modified and a hardware interface device is enabled to interact with various image sequences and alter the multiple contextual dimensions. The textual content of the digital story is dynamically altered.

20 Claims, 13 Drawing Sheets

(51) Int. Cl.
    *G06F 40/205*     (2020.01)
    *G06T 3/40*     (2006.01)
    *G06T 11/60*     (2006.01)

(56) References Cited

U.S. PATENT DOCUMENTS

| | | | |
|---|---|---|---|
| 9,886,427 B2 * | 2/2018 | Lee | G06F 40/284 |
| 10,768,769 B2 * | 9/2020 | Choe | A63F 13/795 |
| 10,930,066 B1 | 2/2021 | Thacker | |
| 10,977,287 B2 * | 4/2021 | Schriber | G06F 16/34 |
| 2019/0107927 A1 | 4/2019 | Schriber | |
| 2019/0304157 A1 * | 10/2019 | Amer | G06V 40/23 |
| 2020/0019370 A1 | 1/2020 | Doggett | |
| 2020/0213680 A1 | 7/2020 | Ingel | |
| 2020/0279554 A1 | 9/2020 | Canter | |

OTHER PUBLICATIONS

International Search Report and Written Opinion; International application No. PCT/CN2022/114746; filing date: Aug. 25, 2022; dated Nov. 9, 2022, 9 pages.

Anonymous; Text to Video Converter; IP.com; IPCOM000246358D; Jun. 2, 2016; 8 pages.

Li, Yitong et al.; StoryGAN: A Sequential Conditional GAN for Story Visualization; 2019 IEEE/CVF Conference on Computer Vision and Pattern Recognition; Jun. 2019; 10 page.

Mell, Peter et al.; "The NIST Definition of Cloud Computing;" National Institute of Standards and Technology; Special Publication 800-145; Sep. 2011; 7 pages.

\* cited by examiner

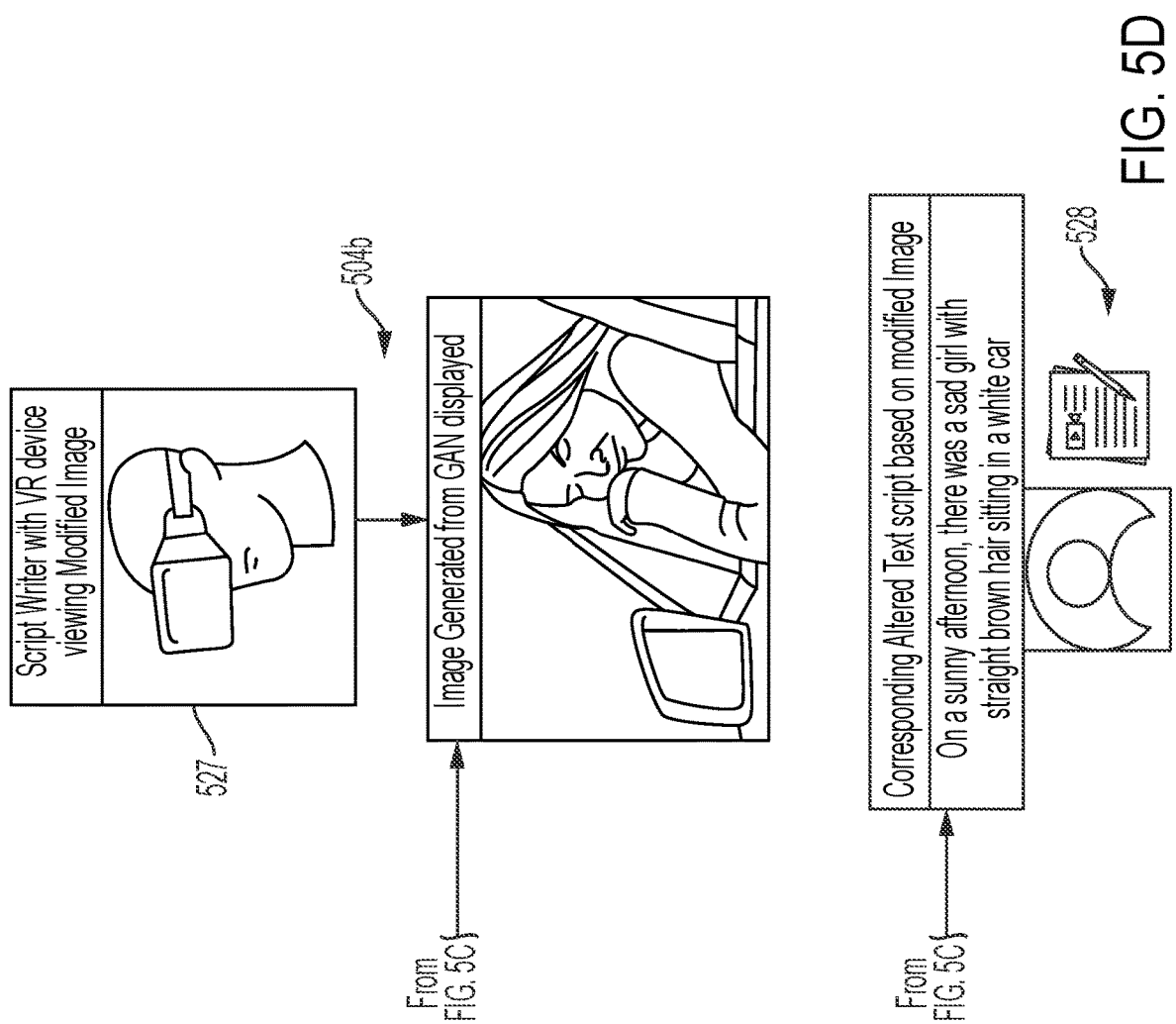

GENERATIVE ADVERSARIAL NETWORK IMPLEMENTED DIGITAL SCRIPT MODIFICATION

BACKGROUND

The present invention relates generally to a method for modifying a digital script and in particular to a method and associated system for improving software technology associated with generating and modifying image sequences associated with textual content of a digital story and dynamically altering associated digital textual content.

SUMMARY

A first aspect of the invention provides a generative adversarial network (GAN) hardware device comprising a processor coupled to a computer-readable memory unit, the memory unit comprising instructions that when executed by the processor implements a natural language processing (NLP) enabled digital script modification method comprising: generating, by the processor, image sequences associated with textual content of a digital story; identifying, by the processor via executing NLP code, multiple contextual dimensions within the textual content; selecting, by the processor in response to user input, a group of dimensions of the multiple contextual dimensions; expanding or contracting, by the processor, the image sequences in combination with the group of dimensions; altering by the processor, the image sequences based on detected interactions with the group of dimensions; extracting, by the processor during presentation of the digital story and the image sequences, dimensions from the group of dimensions; enabling, by the processor, a scriptwriter, associated with the textual content of the digital story, to modify the dimensions; modifying, by the processor, the image sequences based on modifications to the dimensions occurring in response to the enabling; and enabling, by the processor, a hardware interface device to interact with various image sequences of the image sequences and alter the multiple contextual dimensions; and dynamically altering, by the processor in response to the enabling, the textual content of the digital story.

A second aspect of the invention provides a natural language processing (NLP) enabled digital script modification method comprising: generating, by a processor of a generative adversarial network (GAN) hardware device, image sequences associated with textual content of a digital story; identifying, by the processor via executing NLP code, multiple contextual dimensions within the textual content; selecting, by the processor in response to user input, a group of dimensions of the multiple contextual dimensions; expanding or contracting, by the processor, the image sequences in combination with the group of dimensions; altering by the processor, the image sequences based on detected interactions with the group of dimensions; extracting, by the processor during presentation of the digital story and the image sequences, dimensions from the group of dimensions; enabling, by the processor, a scriptwriter, associated with the textual content of the digital story, to modify the dimensions; modifying, by the processor, the image sequences based on modifications to the dimensions occurring in response to the enabling; and enabling, by the processor, a hardware interface device to interact with various image sequences of the image sequences and alter the multiple contextual dimensions; and dynamically altering, by the processor in response to the enabling, the textual content of the digital story.

A third aspect of the invention provides a computer program product, comprising a computer readable hardware storage device storing a computer readable program code, the computer readable program code comprising an algorithm that when executed by a processor of a server implements a natural language processing (NLP) enabled digital script modification method, the method comprising: generating, by the processor, image sequences associated with textual content of a digital story; identifying, by the processor via executing NLP code, multiple contextual dimensions within the textual content; selecting, by the processor in response to user input, a group of dimensions of the multiple contextual dimensions; expanding or contracting, by the processor, the image sequences in combination with the group of dimensions; altering by the processor, the image sequences based on detected interactions with the group of dimensions; extracting, by the processor during presentation of the digital story and the image sequences, dimensions from the group of dimensions; enabling, by the processor, a scriptwriter, associated with the textual content of the digital story, to modify the dimensions; modifying, by the processor, the image sequences based on modifications to the dimensions occurring in response to the enabling; and enabling, by the processor, a hardware interface device to interact with various image sequences of the image sequences and alter the multiple contextual dimensions; and dynamically altering, by the processor in response to the enabling, the textual content of the digital story.

The present invention advantageously provides a simple method and associated system capable of automating digital script modification.

BRIEF DESCRIPTION OF THE DRAWINGS

FIGS. 5A-5D illustrate a process for altering a digital script and generating corresponding image sequences, in accordance with embodiments of the present invention.

DETAILED DESCRIPTION

Figure 1:
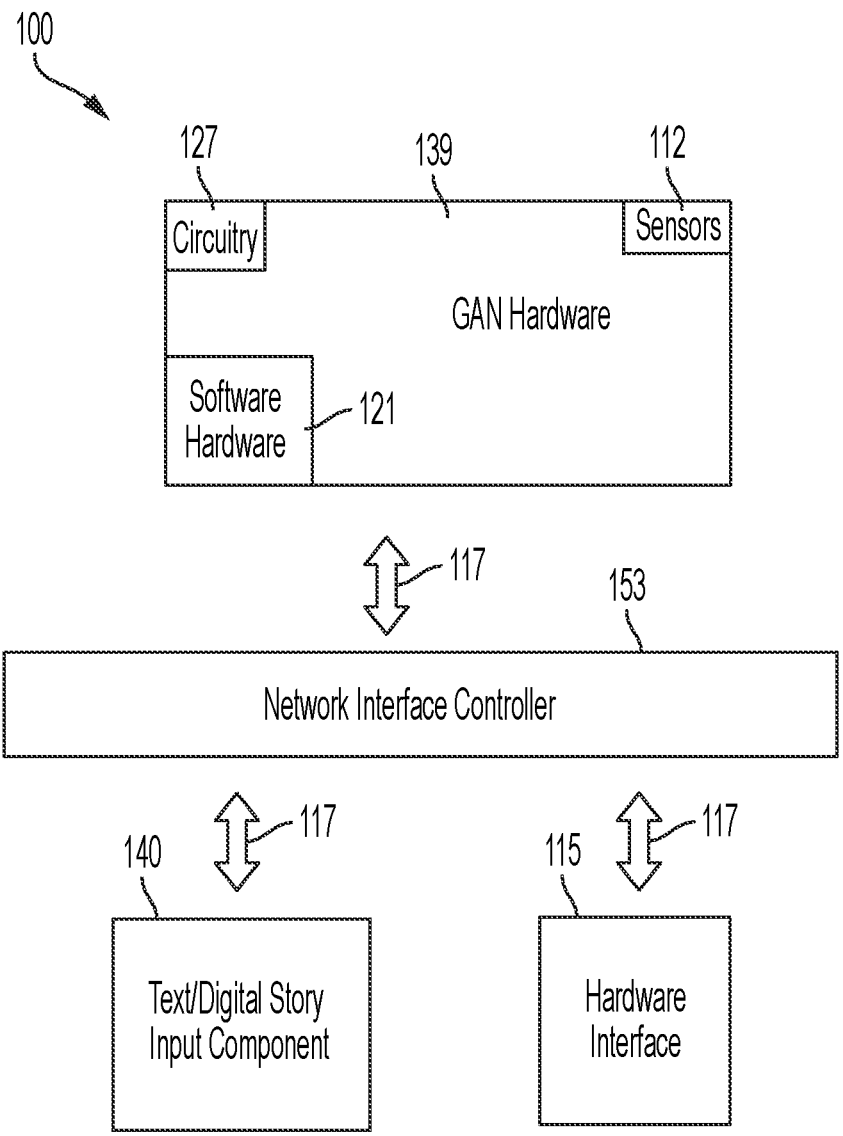
FIG. 1 illustrates a system for improving software technology associated with generating and modifying image sequences associated with textual content of a digital story and dynamically altering associated digital textual content, in accordance with embodiments of the present invention.

FIG. 1 illustrates a system 100 for improving software technology associated with generating and modifying image sequences associated with textual content of a digital story and dynamically altering associated digital textual content, in accordance with embodiments of the present invention. Typical application script writing systems may require a script writer entity to visualize a video presentation requiring text content analysis for image sequence creation. Likewise, during the aforementioned process, a script writer entity may generate a request for expanding a generated image sequence with respect to various dimensions. Additionally, the request may include specifications for viewing a summarization of associated content simultaneously with a command for modifying an associated image with respect to textual content updates associated with image modification. Therefore, system is configured for enabling a script writer entity to expand generated image content within various contextual dimensions for executing image modification. Likewise, system 100 is enabled for automatically updating textual content with respect to image modification.

System 100 comprises a Natural Language Processing (NLP) enabled system for analyzing digital textual story content, identifying various associated contextual dimensions, and automatically generating image sequences based on textual story content via execution of generative adversarial networks (GANs). Likewise, system 100 is configured for enabling a scriptwriter entity to expand and/or alter generated images for dynamically updating digital textual story content. System 100 enables the following features:

System 100 enables a process for identifying (during a process for generating image sequences from digital script contents via usage of GANs) multiple possible contextual dimensions from the digital script contents such that generated image sequences may be expanded or contracted with respect to selected dimensions. Likewise, system 100 enables a process for altering image sequences (via GANs usage) based on interactions with the identified dimensions.

System 100 further enables a process for extracting contextual dimensions from digital textual story content being presented with generated image sequences thereby enabling a scriptwriter entity to modify dimensions based on a determined need. The modified dimensions enable image sequence modification. System 100 may be configured to enable a scriptwriter entity to add additional dimensions with respect to generated image sequences. The newly added dimensions may be modified with respect to the generated image sequences thereby altering the image sequences and (via execution of a reverse GAN model) altering associated textual script content. System 100 may be further configured to enable the scriptwriter entity to selectively alter, remove, and/or add one or more objects to the generated image sequences and dynamically alter written textual story content.

The scriptwriter entity may be enabled to (while interacting with image sequences) to split or stitch multiple image sequences thereby enabling an automatic process for splitting or merging textual story context for creating new story content. A virtual reality (VR) user interface may be enabled for allowing a user to interact with various image sequences, alter contextual dimensions, and dynamically alter the textual story content.

System 100 of FIG. 1 includes a GAN hardware 139, a text/digital story input component 140, a hardware interface 115, and a network interface controller interconnected through a network 7. GAN hardware 139 comprises sensors 112, circuitry 127, and software/hardware 121. Hardware interface may comprise any type of hardware based interface including, inter alia, a virtual reality interface, etc. GAN hardware 139, text/digital story input component 140, and hardware interface 115 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, GAN hardware 139, text/digital story input component 140, and hardware interface 115 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving software technology associated with generating and modifying image sequences associated with textual content of a digital story and dynamically altering associated digital textual content. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is enabled to execute a process (via execution of a natural language processing model) for performing a textual analysis of story script digital content. Based on the analysis, system 100 is configured to identify various contextual dimensions within the story content. Likewise, system 100 analyzes a knowledge corpus with respect to various dimensions such as, inter alia, weather related dimensions, event related dimensions, location related dimensions, time related dimensions, physical X, Y, Z location based dimensions, speed related dimensions, etc. System 100 is further configured to modify various degrees of the contextual dimension such as, inter alia, low degree bad weather vs high degree bad weather, etc. Furthermore, system 100 is configured to generate an image sequence from digital story script content. The image sequence is enabled for identifying various possible dimensions from the textual story script contents.

Figure 2:
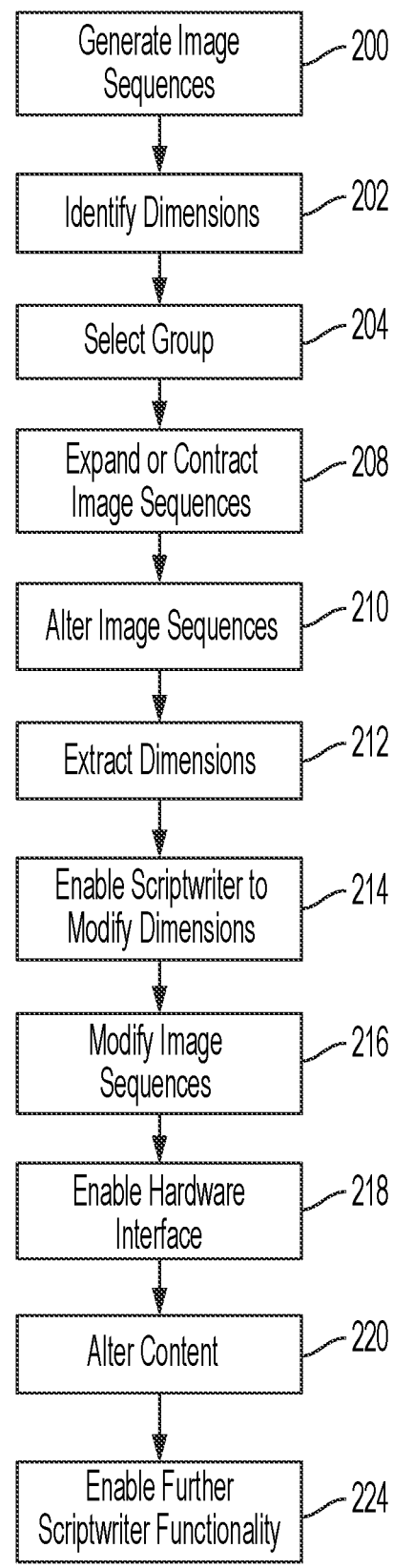
FIG. 2 illustrates an algorithm detailing a process flow enabled by the system of FIG. 1 for improving software technology associated with generating and modifying image sequences associated with textual content of a digital story and dynamically altering associated digital textual content, in accordance with embodiments of the present invention.

FIG. 2 illustrates an algorithm detailing a process flow enabled by system 100 of FIG. 1 for improving software technology associated with generating and modifying image sequences associated with textual content of a digital story and dynamically altering associated digital textual content, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by GAN hardware 139, text/digital Story input component, and hardware interface 115. In step 200, image sequences associated with textual content of a digital story are generated by a GAN hardware device. In step 202, multiple contextual dimensions within the textual content are identified (via execution of NLP code). The contextual dimensions may include dimensions including, inter alia, weather dimensions, event dimensions, location dimensions, time dimensions, physical X, Y, Z location dimensions, speed dimensions, etc.

In step 204, a group of dimensions of the multiple contextual dimensions is selected in response to user input. In step 208, the image sequences are expanded or contracted in combination with the group of dimensions. In step 210, the image sequences are altered based on detected interactions with the group of dimensions. In step 212, dimensions are extracted from the group of dimensions during presentation of the digital story and the image sequences. In step 214, a scriptwriter entity (associated with textual content of the digital story) is enabled to modify the dimensions. In step 216, the image sequences are modified based on modifications to the dimensions occurring in response to results of step 214. In step 218, a hardware interface device is enabled to interact with various image sequences of the image sequences and alter the multiple contextual dimensions. The hardware interface device may include a virtual reality (VR) interface device. In step 220, the textual content of the digital story is dynamically altered.

In step 224, script writer entity functionality may be enabled (via GAN hardware) as described in the following implementation scenarios:

A first scenario enables (via a hardware interface device) the scriptwriter entity to add additional contextual dimensions to the image sequences such that the image sequences are modified. Subsequently, the textual content is modified via execution of a reverse GAN model with respect to results of the image sequence modification.

A second scenario enables (via the hardware interface device) the scriptwriter entity to selectively alter at least one visual object of the image sequences such that the textual content is modified via execution of a reverse GAN model with respect to results of enabling the scriptwriter entity.

A third scenario enables (via the hardware interface device) the scriptwriter entity to selectively remove at least one visual object from the image sequences such that the textual content is modified via execution of a reverse GAN model with respect to results of enabling the scriptwriter entity.

A fourth scenario enables (via the hardware interface device) the scriptwriter entity to selectively add at least one visual object to the image sequences such that the textual content is modified via execution of a reverse GAN model with respect to results of enabling the scriptwriter entity.

A fifth scenario enables (via the hardware interface device during interactions with said various image sequences) the scriptwriter entity to split multiple image sequences of the image sequences. In response, the textual content is split and new textual content is generated for the digital story.

A sixth scenario enables (via the hardware interface device during interactions with said various image sequences) the scriptwriter entity to stitch together multiple image sequences of the image sequences. In response, the textual content is merged and new textual content for the digital story is generated.

Figure 3:
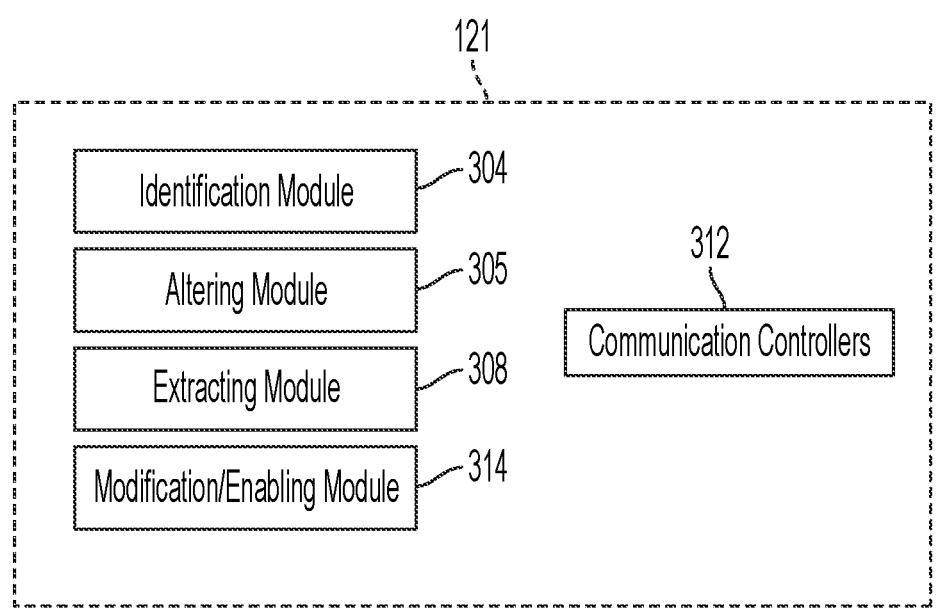
FIG. 3 illustrates an internal structural view of the software/hardware of FIG. 1, in accordance with embodiments of the present invention.

FIG. 3 illustrates an internal structural view of software/hardware 121 (i.e., 121) of FIG. 1, in accordance with embodiments of the present invention. Software/hardware 121 includes an identification module 304, an altering module 305, an extracting module 308, a modification/enabling module 314, and communication controllers 312. Identification module 304 comprises specialized hardware and software for controlling all functions related to the identification steps of FIG. 2. Altering module 305 comprises specialized hardware and software for controlling all functionality related to the altering steps described with respect to the algorithm of FIG. 2. Extracting module 308 comprises specialized hardware and software for controlling all functions related to the extraction steps of FIG. 2. Modification/enabling module 314 comprises specialized hardware and software for controlling all functions related to the modification and enabling steps of the algorithm of FIG. 2. Communication controllers 312 are enabled for controlling all communications between identification module 304, altering module 305, extracting module 308, and modification/enabling module 314.

Figure 4:
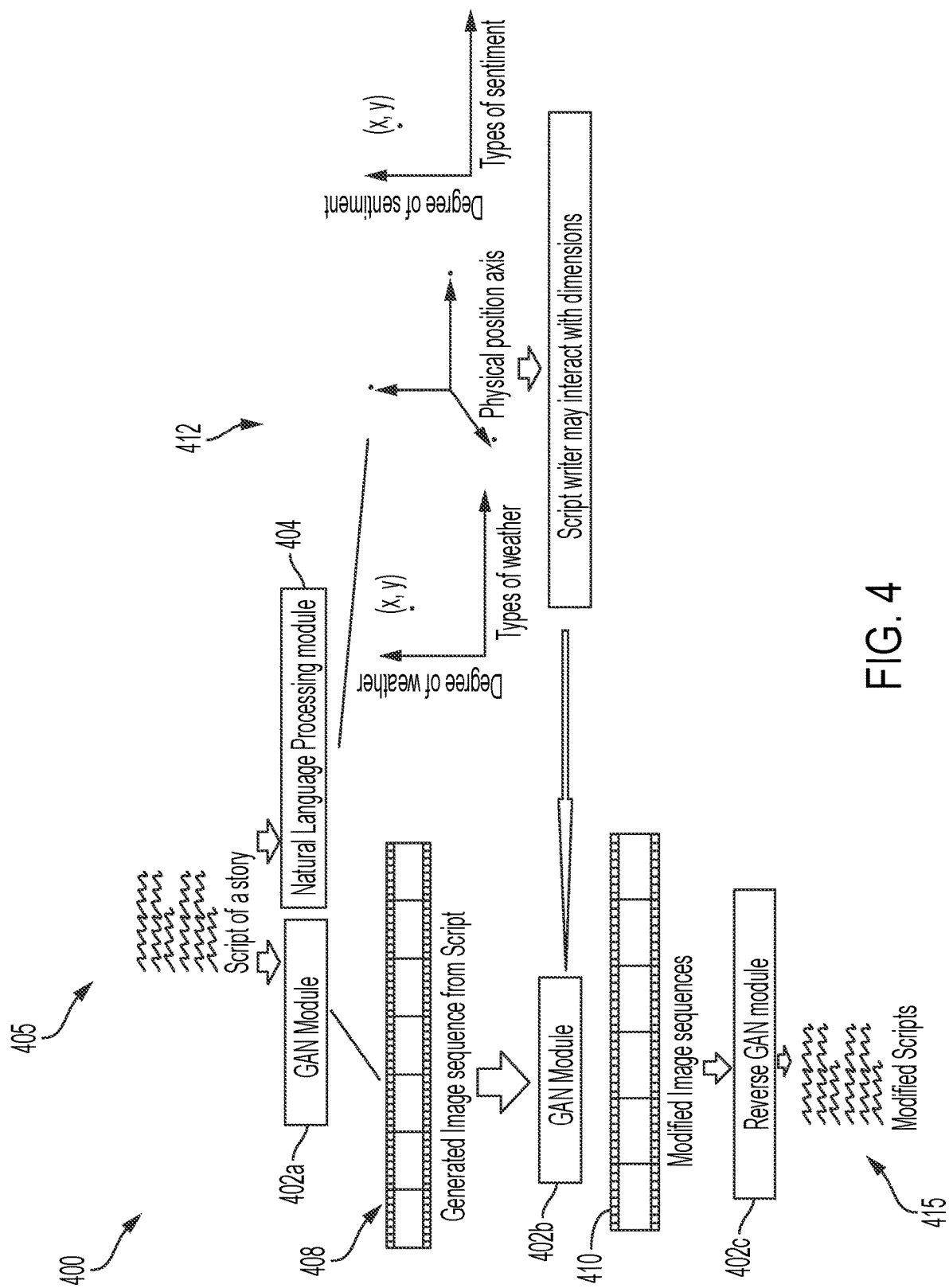
FIG. 4 illustrates a system comprising a GAN module and an NLP module for modifying a digital script of digital story contents, in accordance with embodiments of the present invention.
Figure 5A:
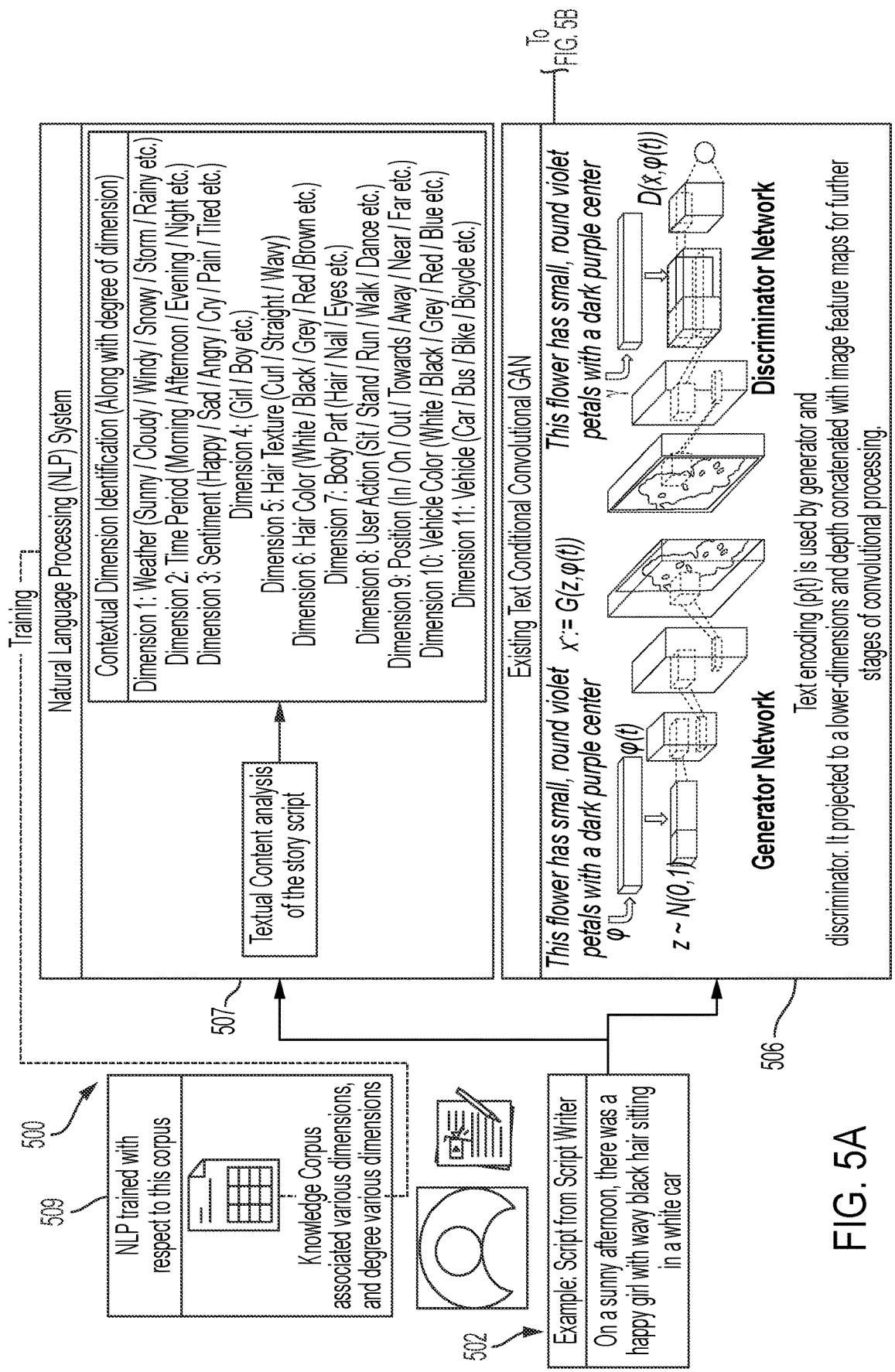
Figure 5B:
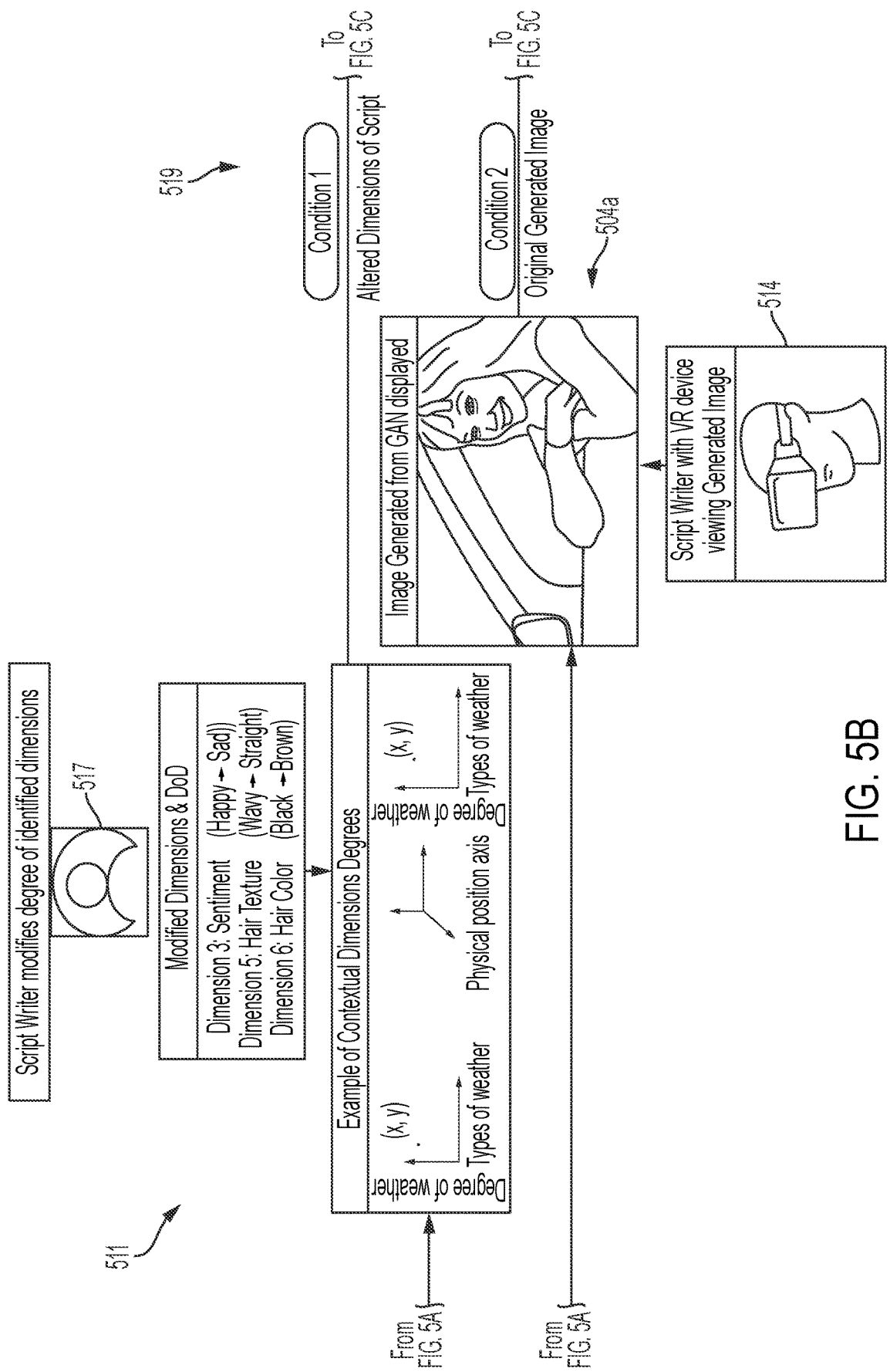
Figure 5C:
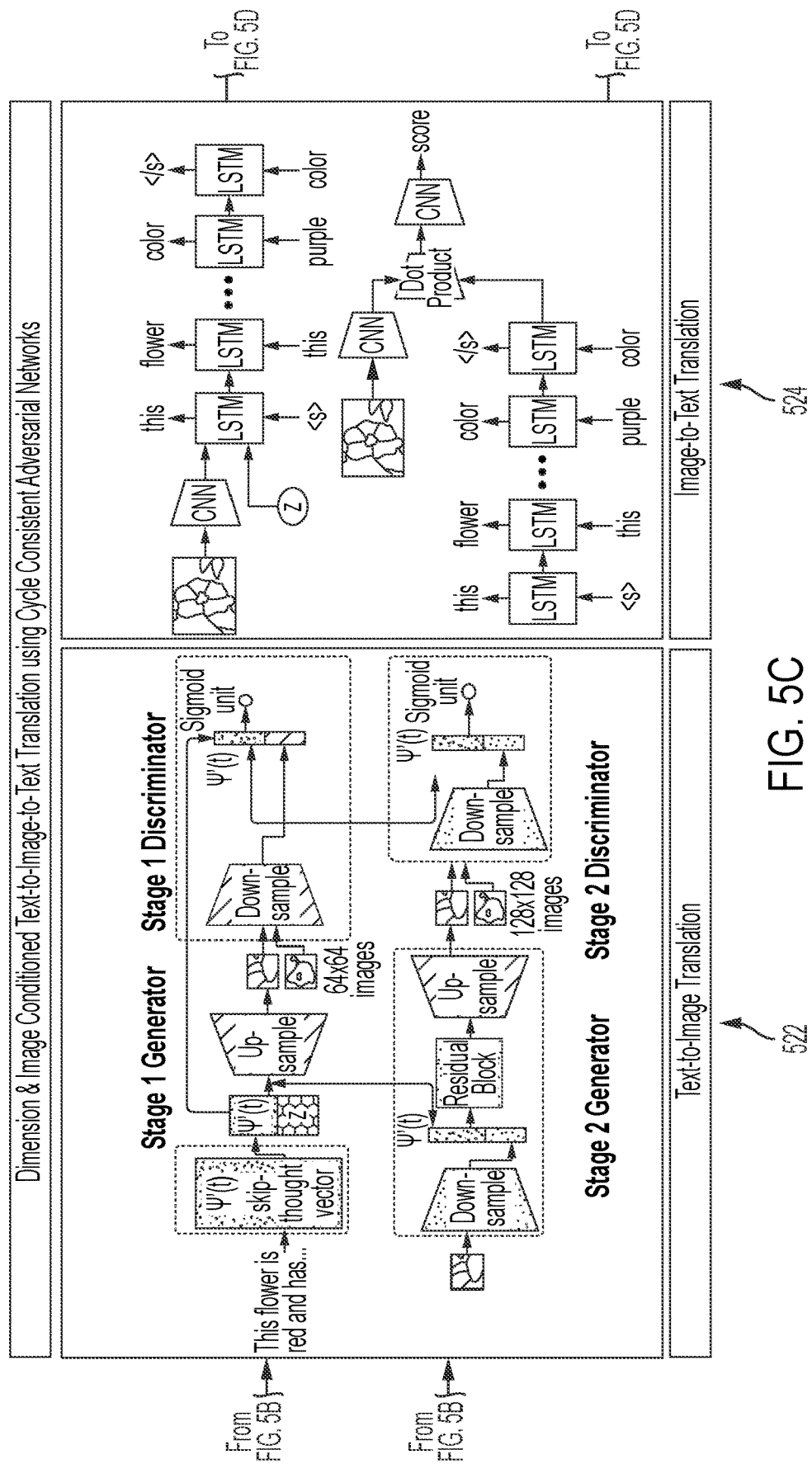

FIG. 4 illustrates a system 400 comprising a GAN module 402a and an NLP module 404 for modifying a digital script 405 of digital story contents, in accordance with embodiments of the present invention. System 400 is configured to present multiple possible dimensions 412 associated with generated image sequences 408 from digital script 405 thereby enabling a script writer entity to alter the dimensions 412. Likewise, GAN module 402a is configured to alter images of generated image sequences 408 such that digital story contents are dynamically updated. Altering images of generated image sequences 408 results in the generation of modified image sequences 410. GAN module 402a may be enabled to generate an image sequence corresponding to input text and a resulting generated image may be viewed by a user.

NLP module 404 may be configured to retrieve a knowledge corpus comprising input text and various dimensions 412 of digital script 405 (e.g., weather dimensions, color dimensions, etc.). In response, system 400 analyzes the input text to identify dimensions available within the digital script 405. Various dimensions 412 of the input text and a relative degree of dimensions are identified. For example, a dimension of "weather" may comprise various degrees associated with it such as, inter alia, sunny, cloudy, windy, rainy, etc. The identified dimensions 412 and relative degree of dimensions may be displayed for the user. Likewise, the user may alter (e.g., add, update, remove, etc.) the dimensions 412 and the degree of dimensions with respect to a selection. A generated image (from GAN module 402) a and the altered dimensions and a related degree of dimensions selected by the user are transmitted as conditional input to a second GAN module 402b. System 400 is further configured to execute conditional text-to-image-to-Text translation code via usage of cycle consistent adversarial networks retrieving inputs (i.e., image and altered dimensions of the user's choice). A text-to-image module (of GAN module 402b) is enabled to generate a modified version of an input image with respect to the user's choice of dimension and degree. A reverse GAN module 402c (i.e., an image-to-text conversion module) retrieves modified image sequence 410 as input and generates relevant text (i.e., modified script 415). Modified image sequence 410 and the corresponding modified script 415 are utilized by the user to finalize a digital script.

FIGS. 5A-5D illustrate a process 500 for altering a digital script 502 and generating corresponding image sequences 504a and 504b, in accordance with embodiments of the present invention. Process 500 is initiated when text content (i.e., digital script 502) is provided as input to a text-to-image GAN module 506 and an NLP module 507 for performing a textual analysis (with respect to knowledge corpus 509) of digital script 502. In response to the textual analysis of digital script 502, system 500 identifies various contextual (and degree dimensions) 511 from story content of digital script 502. Contextual dimensions 511 may comprise, inter alia, weather dimensions, event dimensions, location dimensions, time dimensions, physical X, Y, Z location dimensions, speed dimensions, etc. System 500 further enables various degrees of the contextual dimensions 511. Subsequently, GAN module 506 generates an image sequence 504a (via execution of GAN module 506) from the text content of digital script 502 and identifies the various possible dimensions (of contextual dimensions 511) from the text content. Image sequence 504a may be viewed via a hardware/software interface 514 (e.g., a 2D display, a VR device, etc.). Subsequently, system 500 presents one or more contextual dimensions in combination with image sequence 504a such that a story script writer entity 517 may be enabled (via text to image Gan network component 522 and image to text Gan network component 524) to alter a degree of various dimensions being presented with image sequence 504a. In response to a selection of various altered contextual dimensions 519, system 500 receives associated user input and identifies altered contextual dimensions 519. Altered contextual dimensions 519 are used for analyzing current image sequences (i.e., image sequence 504a) for altering images within image sequence 504a. All modifications of contextual dimensions 511 are considered for updating images within image sequence 504a. Likewise, system 500 enables script writer entity 517 to add additional dimensions and degree of selected dimensions to image sequence 504a and accordingly images of image sequence 504a are updated. Script writer entity 517 may be enabled to selectively alter/add/remove one or more image objects from image sequence 504a such that images of image sequence 504a are altered. Script writer entity 517 may split or stitch differing images and a resulting updated image sequence 504b may be generated and viewed via hardware software interface 527. When an alteration process has completed, system 400 executes a process updating digital script 502 with the modified images of image sequence 504b resulting in generation of modified digital script 528.

Figure 6:
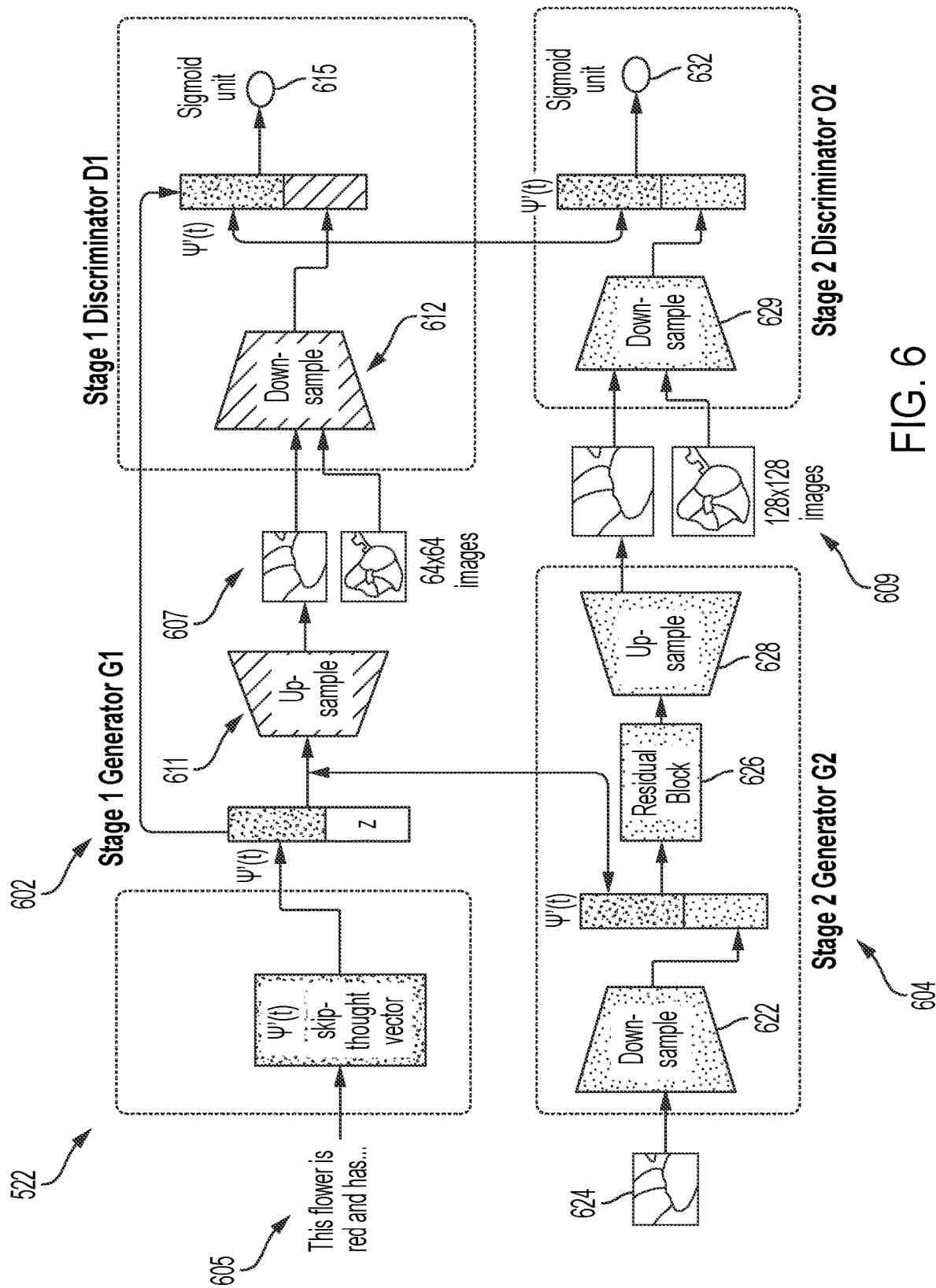
FIG. 6 illustrates a detailed view of the text to image Gan network component of FIG. 5, in accordance with embodiments of the present invention.

FIG. 6 illustrates a detailed view of text to image Gan network component 522 of FIG. 5, in accordance with embodiments of the present invention. Gan network component 522 comprises a first stage 602 (stage 1) and a second stage 604 (stage 2). First stage 602 comprises a generator G1 and discriminator D1 pair. Likewise, second stage 604 comprises a generator G2 and discriminator D2 pair. Generator G1 is configured to generate a low resolution image 607 (e.g., 64×64 ppi) and generator G2 is configured to generate high resolution images 609 (128×128 ppi). Associated text embedding data 605 (i.e., a script) and associated noise may be used as input to first stage 602. Additionally, an image and user altered dimensions and degrees may be used as input to first stage 602. Generator G1 may be configured skip thought text embedding and generate a synthetic image (i.e., low resolution image 607). Likewise, first stage 602 discriminator D1 is conditioned with respect to a same text embedding and is trained to classify between real and synthetic images of resolution 64×64 ppi. Generator G1 comprises a series of up sampling blocks 611. Up sampling blocks 611 comprise enable a nearest-neighbor up sampling process followed by a 3×3 stride 1 convolution process to project an input to a 3×64×64 image (i.e., low resolution image 607) comprising a low resolution (64×64 ppi image). Discriminator D1 comprises of a series of down sampling blocks 612 that project an input to a dimension of 512×4×4. The aforementioned dimension of 512×4×4 is concatenated this with a 128 dimensional compressed embedding and uses a sigmoid layer 615 to produce an output between 0 (Fake) and 1 (Real) to distinguish a low resolution image. Stage-2 generator G1 takes I1 as input along with the embedding and generates higher resolution 128×128 image.

Generator G2 comprises a series of down sampling blocks 622 that project a 3×64×64 input image 624 to a dimension of 512×16×16. Subsequently, a 128 dimensional embedding is concatenated. Input image 624 is transmitted as a series of residual blocks 626 followed by a series of up sampling blocks 628 to produce (a higher resolution) image 609 (i.e., a 128×128 image). Discriminator D2 receives image 609 (as input). Discriminator D2 comprises a series of down sampling blocks 629 and enables a sigmoid layer 632 to produce an output between 0 (Fake) and 1 (Real) to distinguish a high resolution image (128×128). Therefore, an output of the first stage 602 is used as input to the second stage 604 for producing higher resolution images (i.e., high resolution images 609) as an output which comprising user altered dimensions.

Figure 7:
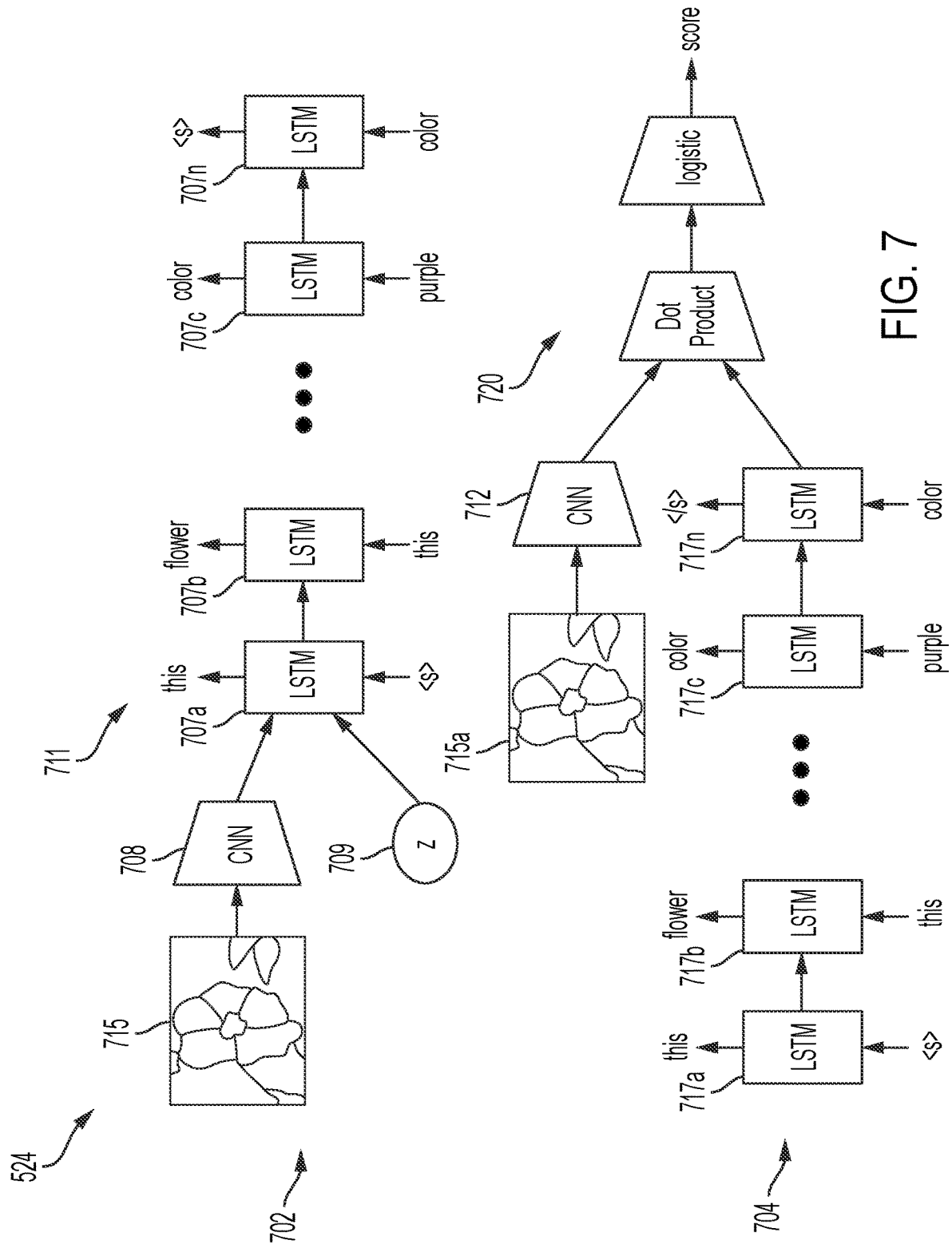
FIG. 7 illustrates a detailed view of the image to text Gan network component of FIG. 5, in accordance with embodiments of the present invention.

FIG. 7 illustrates a detailed view of image to text Gan network component 524 (i.e., caption GAN network component) of FIG. 5, in accordance with embodiments of the present invention. Gan network component 524 comprises components 702 and components 704. Components 702 form a caption generator comprising long term short term memory (LSTM) components 707a . . . 707n for retrieving convolutional neural network (CNN) features 708 and noise Z 709 as input for outputting captions 711. An input to components 702 comprises a high resolution image 715 output (from Gan network component 522 of FIG. 6) comprising user altered dimensions and degrees.

Components 704 form a discriminator that performs a dot product with respect to CNN features 712 of high resolution modified image 715a and an output from LSTM components 707a . . . 707n. High resolution modified image 715a comprising a user's preferred dimensions and degrees is transmitted as input executing a regular sequence modelling process with respect to (LSTM components 717a . . . 717n) to generate corresponding. A resulting output text script 720 comprises user updated dimensions and degrees available for the user to finalize.

Figure 8:
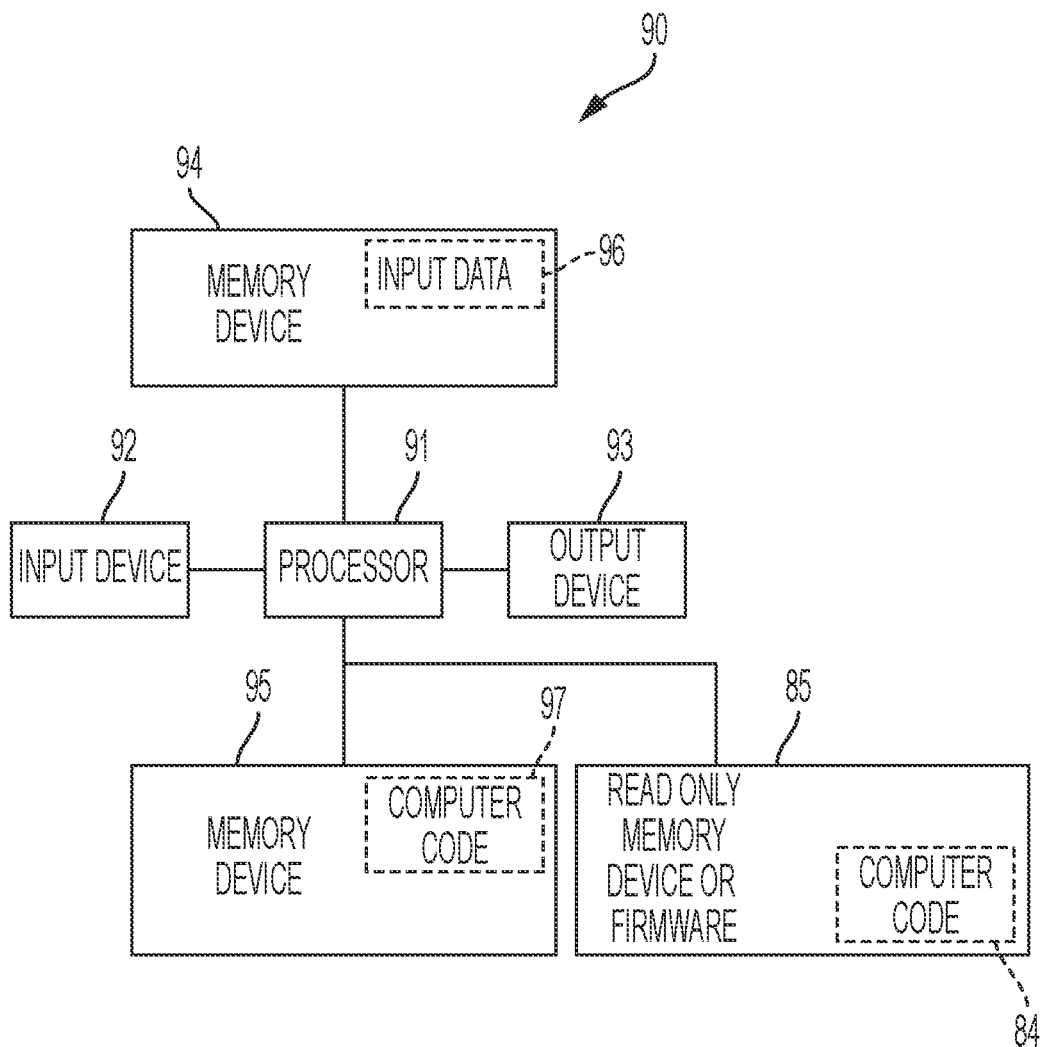
FIG. 8 illustrates a computer system used by the system of FIG. 1 for improving software technology associated with generating and modifying image sequences associated with textual content of a digital story and dynamically altering associated digital textual content, in accordance with embodiments of the present invention.

FIG. 8 illustrates a computer system 90 (e.g., GAN hardware 139, text/digital story input component, and hardware interface 115 of FIG. 1) used by or comprised by the system 100 of FIG. 1 for improving software technology associated with generating and modifying image sequences associated with textual content of a digital story and dynamically altering associated digital textual content, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 8 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software technology associated with generating and modifying image sequences associated with textual content of a digital story and dynamically altering associated digital textual content. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with generating and modifying image sequences associated with textual content of a digital story and dynamically altering associated digital textual content. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with generating and modifying image sequences associated with textual content of a digital story and dynamically altering associated digital textual content. In another embodiment, the invention provides a business method that performs the process steps of the invention on a subscription, advertising, and/or fee basis. That is, a service supplier, such as a Solution Integrator, could offer to enable a process for improving software technology associated with generating and modifying image sequences associated with textual content of a digital story and dynamically altering associated digital textual content. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
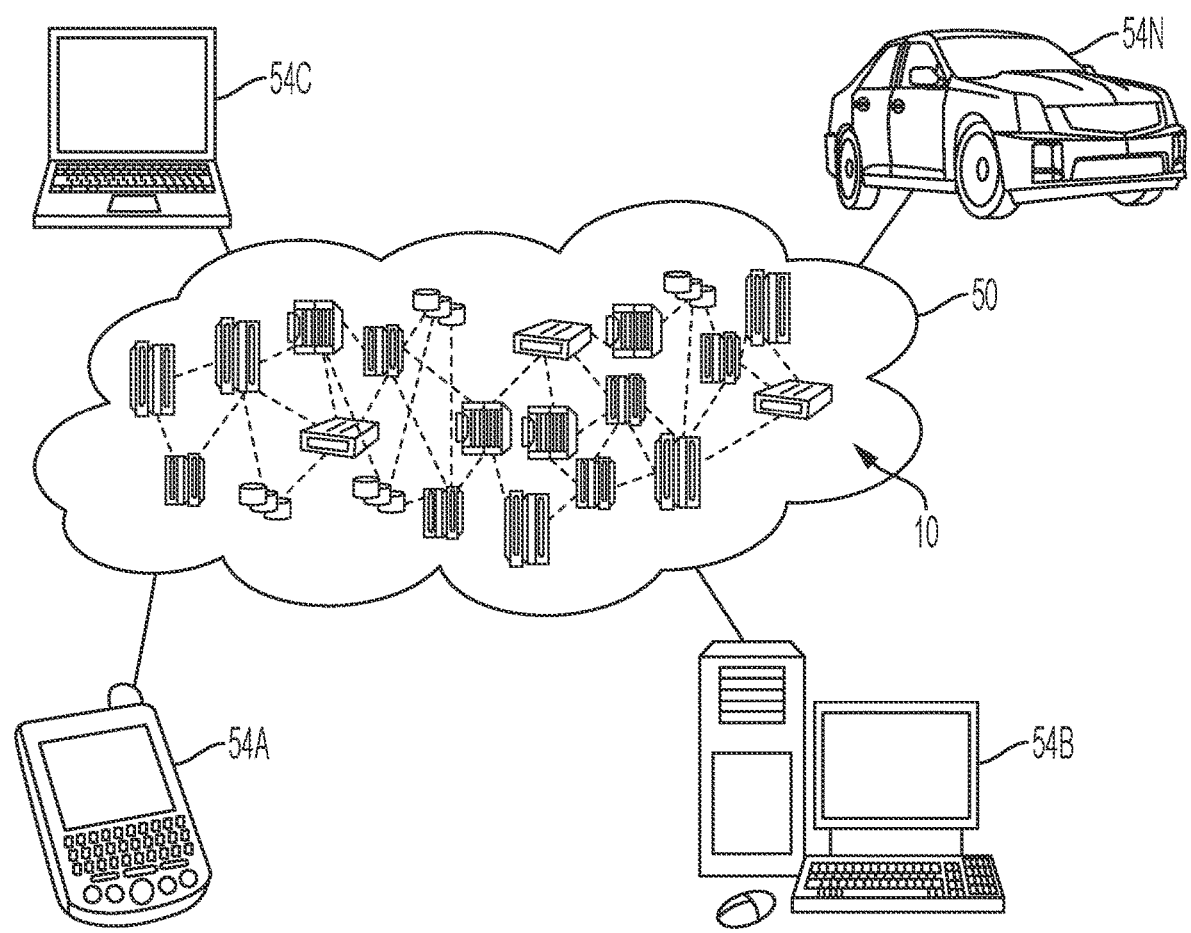
FIG. 9 illustrates a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 10:
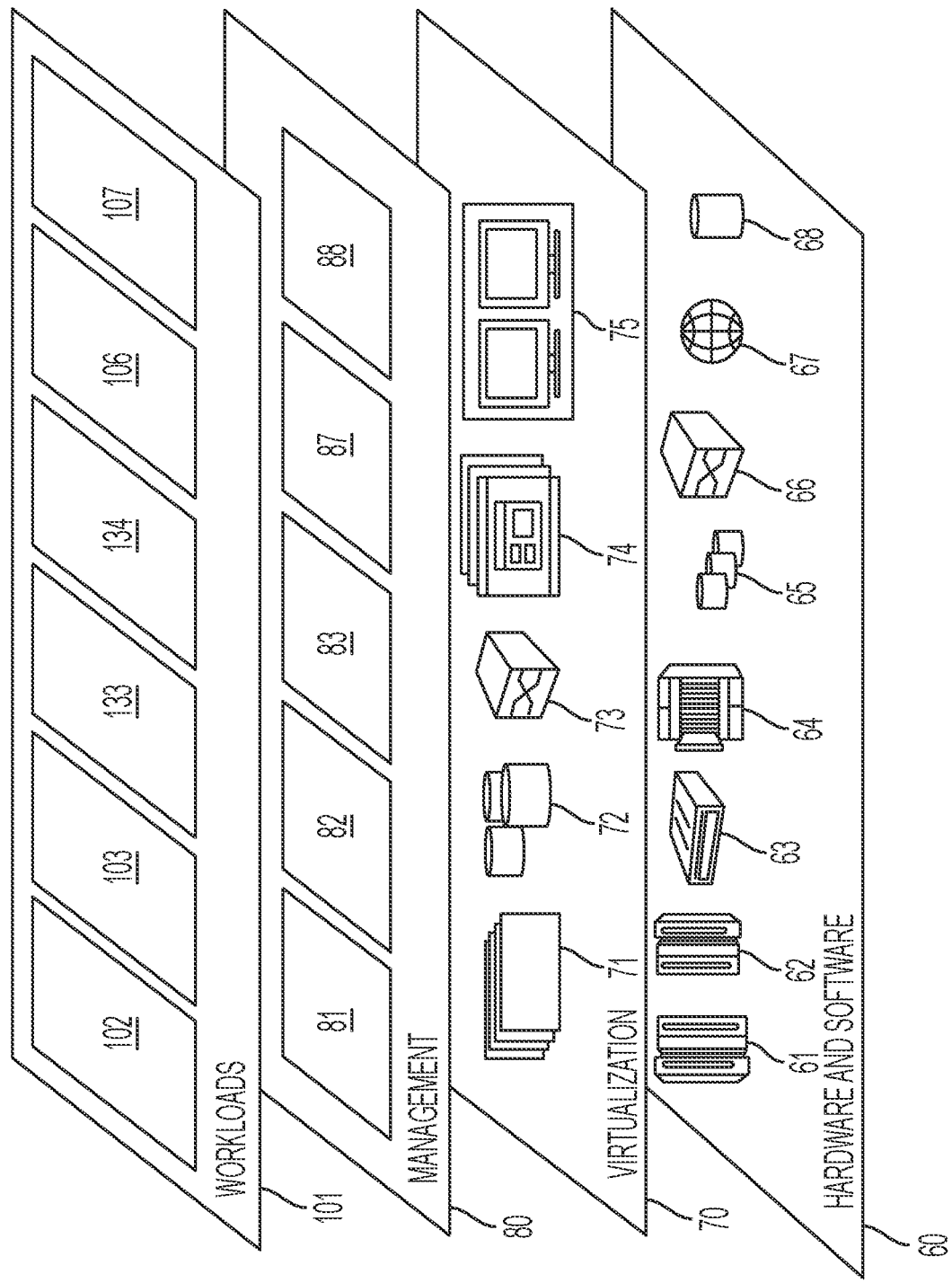
FIG. 10 illustrates a set of functional abstraction layers provided by cloud computing environment, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software technology associated with generating and modifying image sequences associated with textual content of a digital story and dynamically altering associated digital textual content 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A generative adversarial network (GAN) hardware device comprising a processor coupled to a computer-readable memory unit, the memory unit comprising instructions that when executed by the processor implements a natural language processing (NLP) enabled digital script modification method comprising:

generating, by said processor, image sequences associated with textual content of a digital story;

identifying, by said processor via executing NLP code, multiple contextual dimensions within said textual content;

selecting, by said processor in response to user input, a group of dimensions of said multiple contextual dimensions;

expanding or contracting, by said processor, said image sequences in combination with said group of dimensions;

altering by said processor, said image sequences based on detected interactions with said group of dimensions;

extracting, by said processor during presentation of said digital story and said image sequences, dimensions from said group of dimensions;

enabling, by said processor, a scriptwriter, associated with said textual content of said digital story, to modify said dimensions;

modifying, by said processor, said image sequences based on modifications to said dimensions occurring in response to said enabling; and enabling, by said processor, a hardware interface device to interact with various image sequences of said image sequences and alter said multiple contextual dimensions; and dynamically altering, by said processor in response to said enabling, said textual content of said digital story.

2. The GAN hardware device of claim 1, wherein said multiple contextual dimensions comprise dimensions selected from the group consisting of weather dimensions, event dimensions, location dimensions, time dimensions, physical X, Y, Z location dimensions, and speed dimensions.

3. The GAN hardware device of claim 1, wherein said method further comprises:

enabling, by said processor via said hardware interface device, said scriptwriter to add additional contextual dimensions to said image sequences;

first modifying, by said processor with respect to said additional contextual dimensions, said image sequences; and second modifying, by said processor executing a reverse GAN model with respect to results of said first modifying, said textual content.

4. The GAN hardware device of claim 1, wherein said method further comprises:

enabling, by said processor via said hardware interface device, said scriptwriter to selectively alter at least one visual object of said image sequences; and modifying, by said processor executing a reverse GAN model with respect to results of said enabling said script writer, said textual content.

5. The GAN hardware device of claim 1, wherein said method further comprises:

enabling, by said processor via said hardware interface device, said scriptwriter to selectively remove at least one visual object from said image sequences; and modifying, by said processor executing a reverse GAN model with respect to results of said enabling said script writer, said textual content.

6. The GAN hardware device of claim 1, wherein said method further comprises:

enabling, by said processor via said hardware interface device, said scriptwriter to selectively add at least one visual object to said image sequences; and modifying, by said processor executing a reverse GAN model with respect to results of said enabling said script writer, said textual content.

7. The GAN hardware device of claim 1, wherein said method further comprises:

enabling, by said processor via said hardware interface device during interactions with said various image sequences, said scriptwriter to split multiple image sequences of said image sequences;

splitting, by said processor in response to results of said enabling said scriptwriter, said textual content; and generating, by said processor, in response to said splitting, new textual content for said digital story.

8. The GAN hardware device of claim 1, wherein said method further comprises:

enabling, by said processor via said hardware interface device during interactions with said various image sequences, said scriptwriter to stitch together multiple image sequences of said image sequences;

merging, by said processor in response to results of said enabling said scriptwriter, said textual content; and generating, by said processor, in response to said merging, new textual content for said digital story.

9. The GAN hardware device of claim 1, wherein said hardware interface device comprises a virtual reality (VR) interface device.

10. A natural language processing (NLP) enabled digital script modification method comprising:

generating, by a processor of a generative adversarial network (GAN) hardware device, image sequences associated with textual content of a digital story;

identifying, by said processor via executing NLP code, multiple contextual dimensions within said textual content;

selecting, by said processor in response to user input, a group of dimensions of said multiple contextual dimensions;

expanding or contracting, by said processor, said image sequences in combination with said group of dimensions;

altering by said processor, said image sequences based on detected interactions with said group of dimensions;

extracting, by said processor during presentation of said digital story and said image sequences, dimensions from said group of dimensions;

enabling, by said processor, a scriptwriter, associated with said textual content of said digital story, to modify said dimensions;

modifying, by said processor, said image sequences based on modifications to said dimensions occurring in response to said enabling; and enabling, by said processor, a hardware interface device to interact with various image sequences of said image sequences and alter said multiple contextual dimensions; and dynamically altering, by said processor in response to said enabling, said textual content of said digital story.

11. The method of claim 10, wherein said multiple contextual dimensions comprise dimensions selected from the group consisting of weather dimensions, event dimensions, location dimensions, time dimensions, physical X, Y, Z location dimensions, and speed dimensions.

12. The method of claim 10, further comprising:

enabling, by said processor via said hardware interface device, said scriptwriter to add additional contextual dimensions to said image sequences;

first modifying, by said processor with respect to said additional contextual dimensions, said image sequences; and second modifying, by said processor executing a reverse GAN model with respect to results of said first modifying, said textual content.

13. The method of claim 10, further comprising:
enabling, by said processor via said hardware interface device, said scriptwriter to selectively alter at least one visual object of said image sequences; and
modifying, by said processor executing a reverse GAN model with respect to results of said enabling said script writer, said textual content.

14. The method of claim 10, further comprising:
enabling, by said processor via said hardware interface device, said scriptwriter to selectively remove at least one visual object from said image sequences; and
modifying, by said processor executing a reverse GAN model with respect to results of said enabling said script writer, said textual content.

15. The method of claim 10, further comprising:
enabling, by said processor via said hardware interface device, said scriptwriter to selectively add at least one visual object to said image sequences; and
modifying, by said processor executing a reverse GAN model with respect to results of said enabling said script writer, said textual content.

16. The method of claim 10, further comprising:
enabling, by said processor via said hardware interface device during interactions with said various image sequences, said scriptwriter to split multiple image sequences of said image sequences;
splitting, by said processor in response to results of said enabling said scriptwriter, said textual content; and
generating, by said processor, in response to said splitting, new textual content for said digital story.

17. The method of claim 10, further comprising:
enabling, by said processor via said hardware interface device during interactions with said various image sequences, said scriptwriter to stitch together multiple image sequences of said image sequences;
merging, by said processor in response to results of said enabling said scriptwriter, said textual content; and
generating, by said processor, in response to said merging, new textual content for said digital story.

18. The method of claim 10, wherein said hardware interface device comprises a virtual reality (VR) interface device.

19. The method of claim 10, further comprising:
providing at least one support service for at least one of creating, integrating, hosting, maintaining, and deploying computer-readable code in the server, said code being executed by the processor to implement: said generating, said identifying, said selecting, said expanding or contracting, said altering, said extracting, said enabling said scriptwriter, said modifying, said enabling said hardware interface device, and said dynamically altering.

20. A computer program product, comprising a computer readable hardware storage device storing a computer readable program code, said computer readable program code comprising an algorithm that when executed by a processor of a server implements a natural language processing (NLP) enabled digital script modification method, said method comprising:
generating, by said processor, image sequences associated with textual content of a digital story;
identifying, by said processor via executing NLP code, multiple contextual dimensions within said textual content;
selecting, by said processor in response to user input, a group of dimensions of said multiple contextual dimensions;
expanding or contracting, by said processor, said image sequences in combination with said group of dimensions;
altering by said processor, said image sequences based on detected interactions with said group of dimensions;
extracting, by said processor during presentation of said digital story and said image sequences, dimensions from said group of dimensions;
enabling, by said processor, a scriptwriter, associated with said textual content of said digital story, to modify said dimensions;
modifying, by said processor, said image sequences based on modifications to said dimensions occurring in response to said enabling; and
enabling, by said processor, a hardware interface device to interact with various image sequences of said image sequences and alter said multiple contextual dimensions; and
dynamically altering, by said processor in response to said enabling, said textual content of said digital story.

* * * * *